United States Patent
Tanabe (10) Patent No.: US 7,239,471 B2
(45) Date of Patent: Jul. 3, 2007

(54) METHOD OF SETTING THE AMOUNT OF POWER APPLICATION TO HEATER INCORPORATED IN MAGNETORESISTIVE HEAD AND MAGNETIC DISK DRIVE

(75) Inventor: Hideo Tanabe, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/327,671

(22) Filed: Jan. 5, 2006

(65) Prior Publication Data

US 2006/0158768 A1  Jul. 20, 2006

(30) Foreign Application Priority Data

Jan. 5, 2005  (JP)  ............... 2005-000490

(51) Int. Cl.
G11B 21/02  (2006.01)
(52) U.S. Cl. ...................... 360/75
(58) Field of Classification Search ............ None
See application file for complete search history.

(56) References Cited

U.S. PATENT DOCUMENTS 7,097,110 B2 * 8/2006 Sheperek et al. ......... 236/1 C

2003/0174430 A1  9/2003 Takahashi et al.

FOREIGN PATENT DOCUMENTS

JP  2004-241092  8/2004

* cited by examiner

Primary Examiner—K. Wong
(74) Attorney, Agent, or Firm—Townsend and Townsend and Crew LLP; Patrick Duncan (57) ABSTRACT

An integrated circuit in a hard disk drive contains a resistance measurement circuit for a magnetoresistive head. The relationship between the amount of a resistance change in the magnetoresistive head and the amount of a temperature rise, the relationship between the amount of a temperature rise and the average amount of magnetoresistive head protrusion, and a permissible temperature rise value for magnetoresistive head life optimization are entered in a PC. The amount of a resistance change is calculated from a magnetoresistive head's initial resistance value and a resistance value prevailing after power application to a heater. The amount of a temperature rise is determined from the amount of a resistance change. The amount of protrusion is determined from the amount of a temperature rise. If a required protrusion amount is not reached by the amount of protrusion, the amount of power application is increased. If the required protrusion amount is reached by the amount of protrusion, the prevailing amount of power application is regarded as a heater's initial power application amount for shipment and stored in an MPU.

13 Claims, 4 Drawing Sheets

METHOD OF SETTING THE AMOUNT OF POWER APPLICATION TO HEATER INCORPORATED IN MAGNETORESISTIVE HEAD AND MAGNETIC DISK DRIVE

CROSS-REFERENCES TO RELATED APPLICATIONS

This application claims priority from Japanese Patent Application No. JP2005-000490, filed Jan. 5, 2005, the entire disclosure of which is incorporated herein by reference.

BACKGROUND OF THE INVENTION

The present invention relates to a magnetic disk drive that uses a magnetoresistive head, and more particularly to a method of setting the amount of power application to a heater for controlling the magnetoresistive head flying height.

In recent years, the magnetic recording density provided by a magnetic disk drive has remarkably increased. It is mainly due to an extreme reduction in the magnetic head flying height, that is, the gap between a magnetic recording medium and magnetic head in the magnetic disk drive, which relates to a major technology for magnetic recording density increase. However, when the flying height decreases, the probability with which the medium strikes against the magnetic head increases, thereby giving rise to various problems including thermal asperity occurrence, head output attenuation, and head noise increase. Under these circumstances, a new technology is proposed for use with the magnetic head and magnetic disk drive. This technology controls the gap between the medium and magnetic head to such an extent as to avoid the above problems and decreases the gap only when a signal is to be written onto the medium or a medium signal is to be read.

An inductive magnetic head and magnetic disk drive disclosed, for instance, by Patent Document 1 (Japanese Patent Laid-Open No. Hei 5-20635) are such that a thin-film resistor (heater) is embedded in the magnetic head and heated to vary the flying height. A magnetoresistive head and magnetic disk drive disclosed, for instance, by Patent Document 2 (Japanese Patent Laid-Open No. 2003-272335) are such that a signal write section is separate from a signal read section while a heater is incorporated to control the gap between a magnetic recording medium and the magnetic head. A magnetic head slider and magnetic disk drive disclosed, for instance, by Patent Document 3 (Japanese Patent Laid-Open No. 2004-241092) are such that a heater is positioned so as to avoid a temperature rise in a magnetoresistive element and used to control the flying height.

For exercising control to optimize the power application amount for heating the thin-film resistor, the above conventional technologies detect contact between the head and medium, detect the head output level, bring the head into point contact or line contact with the medium, or detect the head ambient temperature and convert it to flying height information.

BRIEF SUMMARY OF THE INVENTION

As described above, the conventional technologies determine the amount of necessary power application for heating a thin-film resistor (heater) by, for instance, detecting contact between the head and medium, detecting the head output level, bringing the head into point contact or line contact with the medium, or detecting the head ambient temperature and converting it to flying height information. However, the method of detecting contact between the head and medium or bringing the head into point contact or line contact with the medium poses a problem because such contact may significantly damage the head, thereby rendering the head unusable. The method of detecting the head ambient temperature and converting it to flying height information poses many problems because the head characteristics resulting from a head production process vary, for instance, from one lot to another, from one wafer to another, within a wafer, or due to a machining process. Therefore, power is continuously applied to the heater in a certain head until a desired output is obtained as far as the head does not come into contact with the medium. In this instance, the temperature of a magnetoresistive element of the magnetoresistive head considerably rises to greatly reduce the power application life of the element. Further, excessive power is applied to the heater so that the power application life of the heater shortens.

When the conventional technologies are used, it is difficult to set up the amount of heater power application while providing an adequate reliability margin in consideration of variations in the head and heater resistance values and head characteristics (the output, the amount of temperature rise, the amount of protrusion of a surface facing the medium, the flying height of the head, etc.), which arise out of variations between lots, variations between wafers, variations within a wafer, and a machining process or the like. Further, it is impossible to set up an optimum power application amount while giving comprehensive consideration to the electrical characteristics of individual heads, the power application life of the magnetoresistive element, the power application life of the heater, and the like. Furthermore, the conventional technologies cannot cope, for instance, with head output changes with time, heater resistance changes with time, magnetoresistive element changes with time, or ambient temperature changes within a magnetic disk drive. For example, the conventional technologies cannot predict or cope with an open circuit that may occur when the heater unexpectedly deteriorates with time.

A first feature of the present invention is to solve the above problems and provide a method of setting the amount of power application to the heater for the purpose of maintaining an optimum flying height for individual magnetoresistive heads.

A second feature of the present invention is to provide a high-reliability magnetic disk drive that is ideal for high-density magnetic read/write operations.

According to one aspect of the present invention, there is provided a method of setting the amount of power application to a heater incorporated in a magnetoresistive head for use with a magnetic disk drive that comprises a magnetic disk for storing information; a magnetoresistive head, which includes a heater for controlling a flying height over the magnetic disk and writes information onto and reads information from the magnetic disk; an integrated circuit, which carries a read/write circuit for the magnetoresistive head and a power application circuit for applying power to the heater; and a control processor, wherein the integrated circuit includes a resistance measurement circuit for measuring the resistance of the magnetoresistive head. The method comprises the steps of: connecting to the magnetic disk drive a computer that stores the relationship between the amount of a resistance change in the magnetoresistive head and a temperature rise, the relationship between a temperature rise and the amount of magnetoresistive head protrusion, and a permissible temperature rise value for magnetoresistive head life optimization; causing the control processor to control the resistance measurement circuit in accordance with instructions from the computer, measure an initial resistance value of the magnetoresistive head, and output the measured value to the computer; starting to apply power to the heater, and causing the resistance measurement circuit to measure the resistance of the magnetoresistive head and output the measured resistance to the computer; causing the computer to calculate the amount of a resistance change in the magnetoresistive head from a resistance value prevailing after power application to the heater and from the initial resistance value; determining the amount of a temperature rise in the magnetoresistive head from the amount of the resistance change; determining the amount of protrusion of the magnetoresistive head from the amount of the temperature rise; judging whether a predetermined protrusion amount is reached by the amount of the protrusion; increasing the amount of power application to the heater when the amount of the protrusion is smaller than the predetermined protrusion amount; and storing, when the predetermined protrusion amount is reached by the amount of the protrusion, the prevailing amount of power application in the control processor as the amount of power application to the heater.

The computer further judges whether the permissible temperature rise value for magnetoresistive head life optimization is reached by the amount of a temperature rise in the magnetoresistive head, and stores the prevailing amount of power application in the control processor as the amount of power application to the heater when the amount of the protrusion is smaller than the predetermined protrusion amount and the permissible temperature rise value is reached by the amount of the temperature rise.

The computer further judges whether the permissible temperature rise value for magnetoresistive head life optimization is reached by the amount of a temperature rise in the magnetoresistive head, and stores the prevailing amount of power application in the control processor as the amount of power application to the heater when the predetermined protrusion amount is reached by the amount of the protrusion or the permissible temperature rise value is reached by the amount of the temperature rise.

The power application amount to be stored in the control processor is the amount of initial power application to the heater.

According to another aspect of the present invention, there is provided a method of setting the amount of power application to a heater incorporated in a magnetoresistive head for use with a magnetic disk drive that comprises a magnetic disk for storing information; a magnetoresistive head, which includes a heater for controlling a flying height over the magnetic disk and writes information onto and reads information from the magnetic disk; an integrated circuit, which carries a read/write circuit for the magnetoresistive head and a power application circuit for applying power to the heater; and a control processor, wherein the integrated circuit includes a resistance measurement circuit for measuring the resistance of the heater. The method comprises the steps of: connecting to the magnetic disk drive a computer that stores the relationship between the amount of a resistance change in the heater and a temperature rise, the relationship between a temperature rise and the amount of magnetoresistive head protrusion, and a permissible temperature rise value for magnetoresistive head life optimization; causing the control processor to control the resistance measurement circuit in accordance with instructions from the computer, measure an initial resistance value of the heater, and output the measured value to the computer; starting to apply power to the heater, and causing the resistance measurement circuit to measure the resistance of the heater and output the measured resistance to the computer; causing the computer to calculate the amount of a resistance change in the heater from a resistance value prevailing after power application to the heater and from the initial resistance value; determining the amount of a temperature rise in the heater from the amount of the resistance change; determining the amount of protrusion of the magnetoresistive head from the amount of the temperature rise; judging whether a predetermined protrusion amount is reached by the amount of the protrusion; increasing the amount of power application to the heater when the amount of the protrusion is smaller than the predetermined protrusion amount; and storing, when the predetermined protrusion amount is reached by the amount of the protrusion, the prevailing amount of power application in the control processor as the amount of power application to the heater.

The computer further judges whether the permissible temperature rise value for magnetoresistive head life optimization is reached by the amount of a temperature rise in the heater, and stores the prevailing amount of power application in the control processor as the amount of power application to the heater when the amount of the protrusion is smaller than the predetermined protrusion amount and the permissible temperature rise value is reached by the amount of the temperature rise.

The computer further judges whether the permissible temperature rise value for magnetoresistive head life optimization is reached by the amount of a temperature rise in the heater, and stores the prevailing amount of power application in the control processor as the amount of power application to the heater when the predetermined protrusion amount is reached by the amount of the protrusion or the permissible temperature rise value is reached by the amount of the temperature rise.

According to another aspect of the present invention, there is provided a magnetic disk drive comprising: a magnetic disk for storing information; a magnetoresistive head, which includes a heater for controlling a flying height over the magnetic disk and writes information onto and reads information from the magnetic disk; an integrated circuit, which carries a read/write circuit for supplying a write signal to the magnetoresistive head and receiving a read signal from the magnetoresistive head, a resistance measurement circuit for measuring the resistance of the magnetoresistive head, and a power application circuit for applying power to the heater; and a control processor for storing the relationship between the amount of a resistance change in the magnetoresistive head and a temperature rise, the relationship between a temperature rise and the amount of magnetoresistive head protrusion, and a permissible temperature rise value for magnetoresistive head life optimization. The control processor supplies a specified current to the magnetoresistive head; causes the resistance measurement circuit to measure an initial resistance value of the magnetoresistive head; starts applying power to the heater and causes the resistance measurement circuit to measure the resistance of the magnetoresistive head; calculates the amount of a resistance change in the magnetoresistive head from a resistance value prevailing after power application to the heater and from the initial resistance value; determines the amount of a temperature rise in the magnetoresistive head from the amount of the resistance change; determines the amount of protrusion of the magnetoresistive head from the amount of the temperature rise; judges whether a predetermined protrusion amount is reached by the amount of the protrusion; increases the amount of power application to the heater when the amount of the protrusion is smaller than the predetermined protrusion amount; and stores, when the predetermined protrusion amount is reached by the amount of the protrusion, the prevailing amount of power application as the amount of power application to the heater.

The control processor further judges whether the permissible temperature rise value for magnetoresistive head life optimization is reached by the amount of a temperature rise in the magnetoresistive head, and stores the prevailing amount of power application as the amount of power application to the heater when the amount of the protrusion is smaller than the predetermined protrusion amount and the permissible temperature rise value is reached by the amount of the temperature rise.

The control processor further judges whether the permissible temperature rise value for magnetoresistive head life optimization is reached by the amount of a temperature rise in the magnetoresistive head, and stores the prevailing amount of power application as the amount of power application to the heater when the predetermined protrusion amount is reached by the amount of the protrusion or the permissible temperature rise value is reached by the amount of the temperature rise.

The present invention provides a method of setting the amount of power application to a heater for the purpose of maintaining an optimum flying height for individual magnetoresistive heads.

The present invention also provides a high-reliability magnetic disk drive that is ideal for high-density magnetic read/write operations.

DETAILED DESCRIPTION OF THE INVENTION

Figure 1:
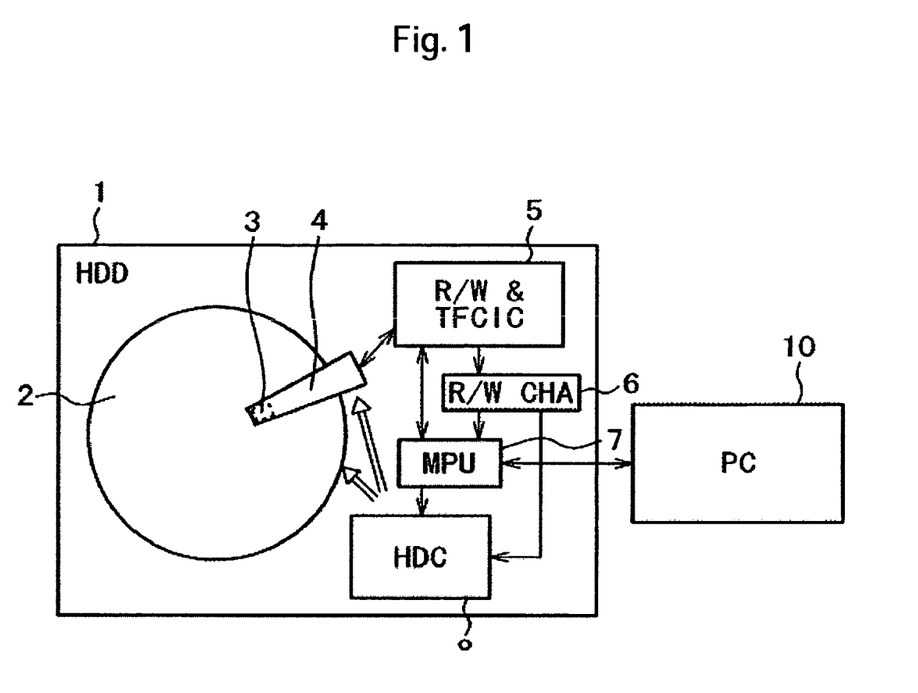
FIG. 1 is a system configuration diagram for implementing a first embodiment of the present invention.

Embodiments of the present invention will now be described. FIG. 1 is used to describe a method of setting the amount of power application to a TFC heater for a magnetoresistive head according to a first embodiment of the present invention. This figure illustrates a system configuration in which a personal computer (PC) 10 is connected to a hard disk drive (HDD) 1. The HDD 1 includes a magnetic disk 2, a magnetoresistive head 3 for writing information onto and reading information from the magnetic disk 2, and a suspension 4 for supporting the magnetoresistive head 3. The HDD 1 also includes a R/W circuit for supplying a write signal to the magnetoresistive head 3 and amplifying a read signal of the magnetoresistive head 3, a heater power application circuit for applying power to a TFC heater that is incorporated in the magnetoresistive head 3, and an integrated circuit (R/W & TFC IC) 5 in which a resistance measurement circuit is mounted to measure a resistance value of the magnetoresistive head 3. Further, the HDD 1 includes a read/write channel (R/W CHA) for encoding a write signal supplied from a host device and decoding a read signal, a hard disk controller (HDC) 8 that contains an error correction circuit and servo circuit, and a control processor (MPU) 7 for controlling the above-mentioned components.

Figure 4:
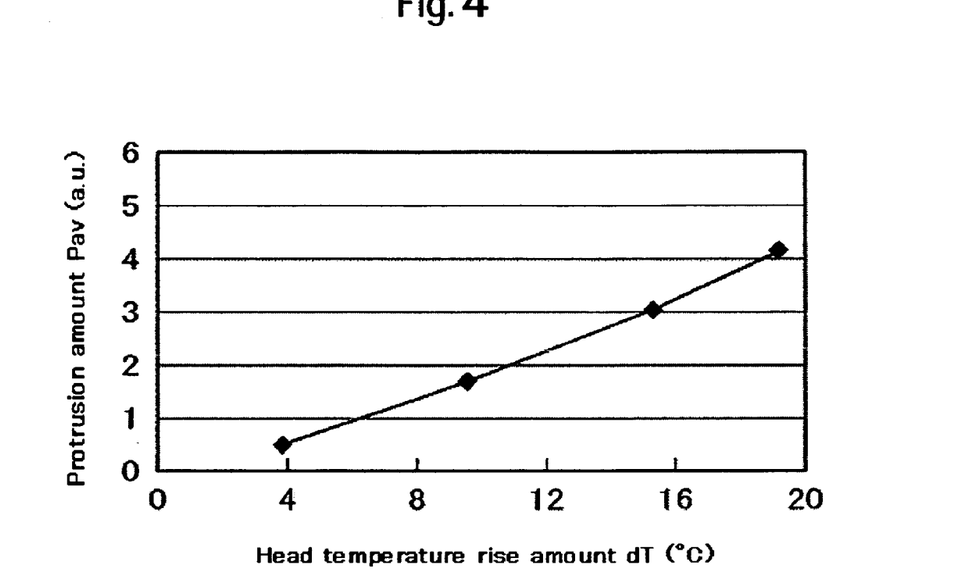
FIG. 4 illustrates the relationship between a temperature rise amount dT of a magnetoresistive head and an average protrusion amount Pav of a surface facing a medium.

The relationship between the amount of a resistance change dR in the magnetoresistive head and the amount of a temperature rise dT, the relationship between the amount of a temperature rise dT and the average amount of magnetoresistive head protrusion Pav, and a permissible temperature rise value dT1 for magnetoresistive head life optimization are input and stored in the PC 10. FIG. 4 shows the relationship between the temperature rise amount dT of the magnetoresistive head and the average protrusion amount Pav of a surface facing a medium.

When a signal is to be written or read, the HDD 1 applies power to the TFC heater, which is incorporated in the magnetoresistive head 3, and protrudes the medium-facing surface of the magnetoresistive head 3, from which a write element and read element are exposed, to adjust the clearance to the magnetic disk 2 (head flying height) for an optimum write/read operation. To achieve this purpose, it is necessary to optimize the power application amount setting for the TFC heater.

To optimize the power application amount, a conventional method makes measurements to predetermine the average flying height value Hav and variance flying height value $\sigma$h of the magnetoresistive head to be mounted in the HDD, determines the relationship Pav=f1(V) between the average protrusion amount value Pav of the magnetoresistive head surface facing the medium, which prevails when power is applied to the TFC heater, and the amount of power application V, and determines the relationship dT=f2(V) between the TFC heater power application amount V and the magnetoresistive head temperature rise dT. If the flying height required for a substantially ideal read/write operation is Hav–$\Delta$H, either the value V1, which is determined from the required protrusion amount P1=$\Delta$H=f1(V1), or the value V2, which is determined from a temperature rise value dT1=f2(V2) that depends on the power application life of the above magnetoresistive head, is employed as the power application amount setting V0 for actual use in the HDD, whichever is smaller. If, for instance, V1$\geq$V2, V0=V2.

In reality, however, various problems occur with the HDD. Even when the amount of power applied to the TFC heater is V2, the required flying height Hav–$\Delta$H is not reached in many cases. In many other cases, the temperature rise of the magnetoresistive head exceeds the specified value dT1 so that the flying height unduly decreases. Thus, stable read/write operations cannot be performed due to such variations. The reason is that the head and heater resistance values and head characteristics (the output, the amount of temperature rise, the amount of protrusion of a surface facing the medium, the flying height of the head, etc.) vary due to variations between lots, variations between wafers, variations within a wafer, and a machining process or the like.

To solve the above problems, the present embodiment furnishes the integrated circuit 5 with a resistance measurement circuit for measuring the resistance of the magnetoresistive head 3, determines the amount of a resistance change dR in each head under control of the PC 10 when power is applied to the TFC heater, and calculates the head temperature rise dT from the determined resistance change amount dR. FIG. 4 illustrates the relationship between the input amount of magnetoresistive head temperature rise dT and the average protrusion amount value Pav of the surface facing the medium. The figure indicates that the relationship between the temperature rise amount dT and the average protrusion amount value Pav of the surface facing the medium is expressed by the equation Pav=f3(dT). It means that the value Pav can be determined when the value dT is determined. In the present embodiment, therefore, the PC 10 calculates the temperature rise amount dT2 prevailing when V2 is applied and the prevailing protrusion amount P2 from the equation Pav=f3(dT). If the values dT2 and P2 are smaller than the specified temperature dT1 and required protrusion amount P1, respectively, the PC 10 increases the power application amount V of the heater power application circuit by a specified step amount Δ. The PC 10 determines the power application amount V3 prevailing when either of the specified values is reached, and uses the determined value as a heater initial setting. If the value dT2 or P2 exceeds the value dT1 or P1 while V2 is being applied to the heater power application circuit, the PC 10 uses the prevailing power application amount V as an initial heater power application amount setting. If the value dT2 or P2 is equal to the value dT1 or P1 when the power application amount is V2, the PC 10 uses the value V2 as the initial setting.

Figure 2:
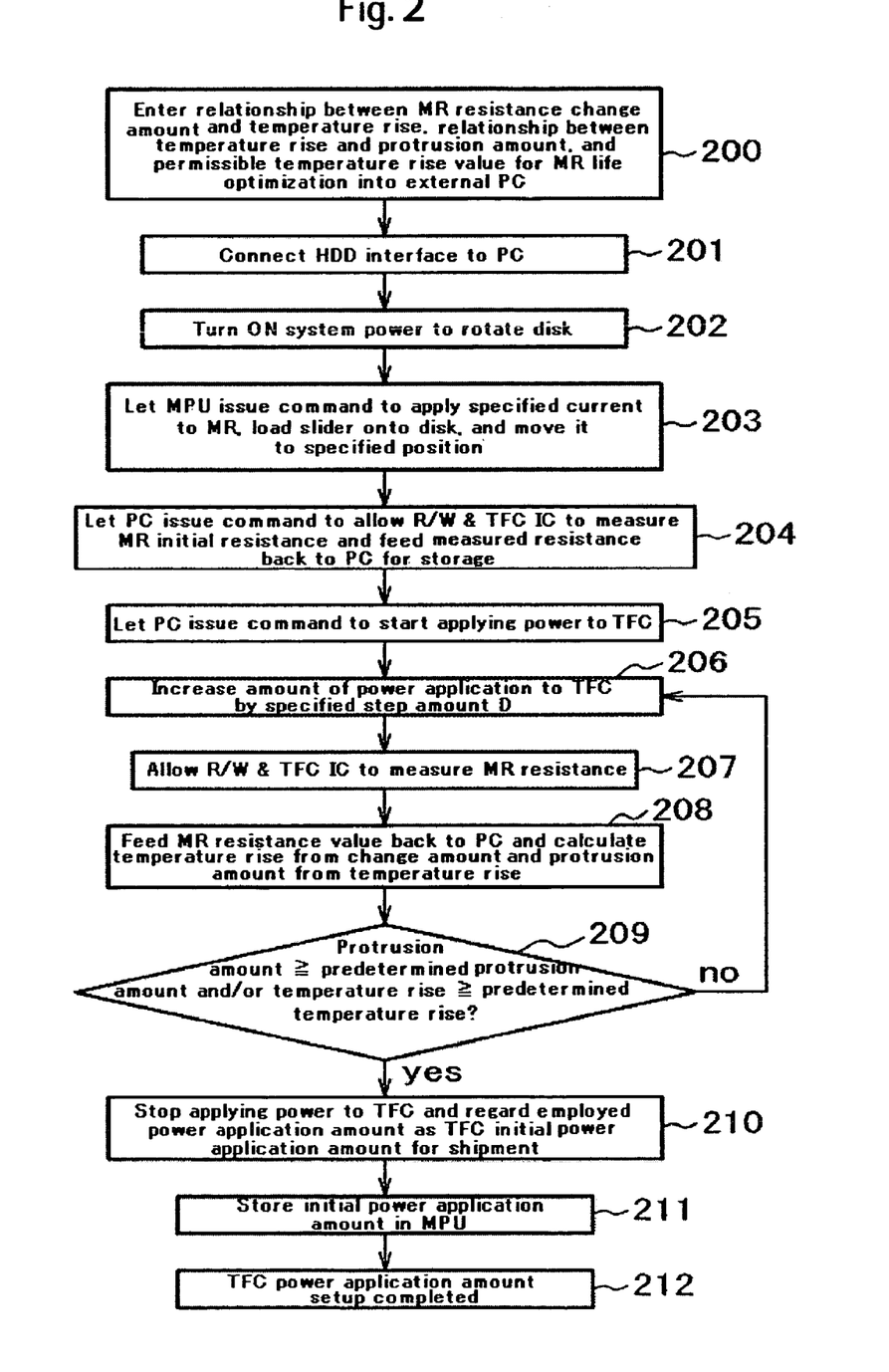
FIG. 2 is a flowchart illustrating a procedure for setting the amount of power application to a TFC heater in accordance with the first embodiment of the present invention.

FIG. 2 is a flowchart illustrating the details of a setup procedure. Step 200 is first performed to enter in the PC 10 the relationship between the amount of a magnetic resistance change dR in the magnetoresistive head and the amount of temperature rise dT, the relationship between the amount of temperature rise dT and the average amount Pav of magnetoresistive head protrusion, and the permissible temperature rise value dT1 for magnetoresistive head life optimization.

In step 201, the HDD 1 is connected to the PC 10. In step 202, the system power is turned ON to rotate the magnetic disk 2 of the HDD 1.

In step 203, the MPU 7 of the HDD 1 issues a command to apply a specified current to the magnetoresistive head 3, loads the magnetoresistive head 3 onto the magnetic disk, and moves the magnetoresistive head 3 to a specified position.

In step 204, the PC 10 issues a command. In compliance with the command, the resistance measurement circuit operates to measure the initial resistance of the magnetoresistive element of the magnetoresistive head 3 and feeds the measured data back to the PC 10.

In step 205, the PC 10 issues another command. In compliance with the command, the heater power application circuit operates to start applying power to the TFC heater. In step 206, the heater power application circuit increases the power application amount V by a specified step amount Δ.

In step 207, the resistance measurement circuit operates to measure the magnetoresistive element's resistance value that prevails after power application to the TFC heater.

In step 208, the PC 10 receives the magnetoresistive element's resistance value that prevails after power application to the TFC heater, calculates the resistance change amount dR from the received resistance value and the above-mentioned initial resistance value, determines the temperature rise amount dT from the resistance change amount dR, and determines the protrusion amount P2 from the temperature rise amount dT.

In step 209, the PC 10 judges whether the required protrusion amount P1 is reached by the protrusion amount P2.

If the required protrusion amount P1 is not reached by the protrusion amount P2 in step 209, the program flow returns to step 206 so that the amount of power application V to the TFC heater is increased by the specified step amount Δ.

If the required protrusion amount P1 is reached by the protrusion amount P2 in step 209, step 210 is performed to stop applying power to the TFC heater. The employed power application amount V1 is then regarded as the TFC heater initial power application amount for shipment of the HDD. Next, step 211 is performed to store the TFC heater initial power application amount in the MPU 7.

TFC heater power application amount setup is now completed (step 212).

In step 209, the PC 10 decides whether the required protrusion amount P1 is reached by the protrusion amount P2. Alternatively, however, the PC 10 may decide whether the specified temperature dT1, which is stipulated according to the power application life of the magnetoresistive head 3, is reached by the temperature rise amount dT of the magnetoresistive head 3. If the specified temperature dT1 is not reached by the temperature rise amount dT, the program flow may return to step 206 so that the amount of power application V to the TFC heater is increased by the specified step amount Δ. If, on the other hand, the specified temperature dT1 is reached by the temperature rise amount dT, the prevailing power application amount V2 may be regarded as the TFC heater initial power application amount for shipment of the HDD.

In another alternative scheme for step 209, the PC 10 may decide whether the required protrusion amount P1 is reached by the protrusion amount P2 of the magnetoresistive head 3 and decide whether the permissible temperature rise value dT1 for magnetoresistive head life optimization (a specified temperature stipulated by the power application life of the magnetoresistive head 3) is reached by the temperature rise amount dT of the magnetoresistive head 3. If neither the required protrusion amount P1 nor the specified temperature dT1 is reached, the amount of power application V to the TFC heater may be increased by the specified step amount Δ. If either the required protrusion amount P1 or the specified temperature dT1 is reached, the prevailing power application amount V3 may be regarded as the TFC heater initial power application amount.

When the above alternative schemes are used, considerable improvements can be effected in various situations where, for instance, an expected output cannot be obtained because an expected protrusion amount is not obtained by applying power to the TFC heater, the head might come into contact with a medium due to an excessive protrusion amount, or the power application life of the magnetoresistive head might shorten due to an excessive temperature rise.

Figure 5:
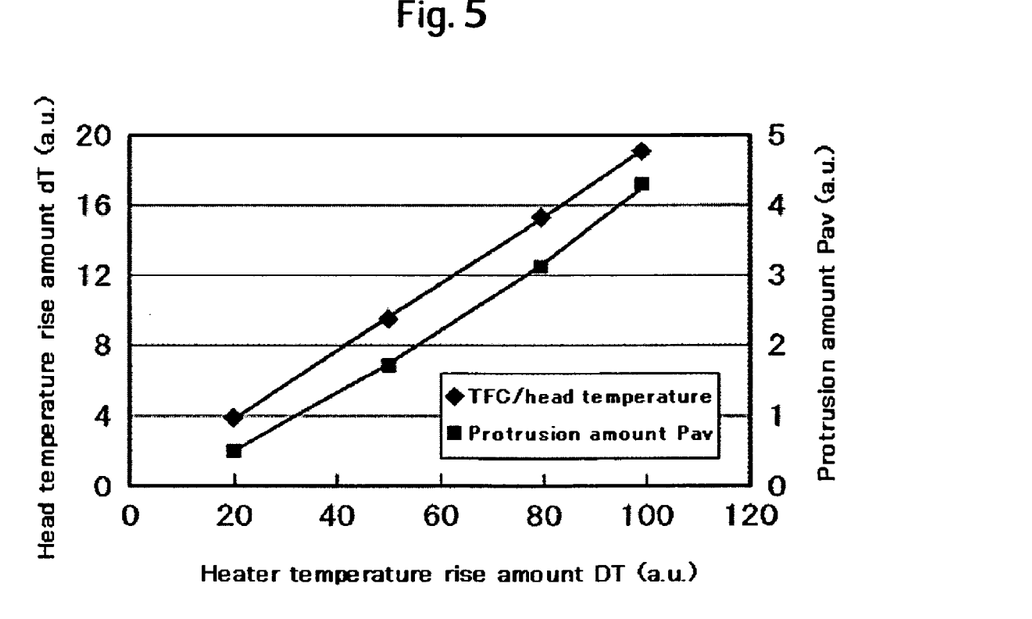
FIG. 5 illustrates the relationship between a temperature rise amount $\Delta T$ of a TFC heater and an average protrusion amount Pav of a surface facing a medium.

The foregoing embodiment furnishes the integrated circuit 5 of the HDD 1 with a resistance measurement circuit for measuring the resistance value of the magnetoresistive element of the magnetoresistive head 3, calculates the resistance change amount from the initial resistance value of the magnetoresistive element and the magnetoresistive element's resistance value prevailing after power application to the TFC heater, and determines the temperature rise amount of the magnetoresistive head from the resistance change amount. However, an alternative is to furnish the integrated circuit 5 of the HDD 1 with a resistance measurement circuit for measuring the resistance of the TFC heater, calculate the resistance change amount from the initial resistance value of the TFC heater and the TFC heater's resistance value prevailing after power application to the TFC heater, and determine the temperature rise amount of the magnetoresistive head 3 from the resistance change amount of the TFC heater. In this case, the relationship between the heater temperature rise amount ΔT and head temperature rise amount dT and the relationship to the average head protrusion amount Pav must be entered in the PC 10 beforehand as indicated in FIG. 5. In this case, too, the same advantages are provided as in the first embodiment, which has been described above.

As described above, the first embodiment and its modified versions make it possible to set up the amount of heater power application while providing an adequate reliability margin in consideration of variations in the head and TFC heater resistance values and head characteristics (the output, the amount of temperature rise, the amount of protrusion of a surface facing the medium, the flying height of the head, etc.), which arise out of variations between lots, variations between wafers, variations within a wafer, and a machining process or the like. Consequently, it is possible to set up an optimum TFC heater power application amount while giving comprehensive consideration to the electrical characteristics of individual heads, the power application life of the magnetoresistive element, the power application life of the heater, and the like.

Figure 3:
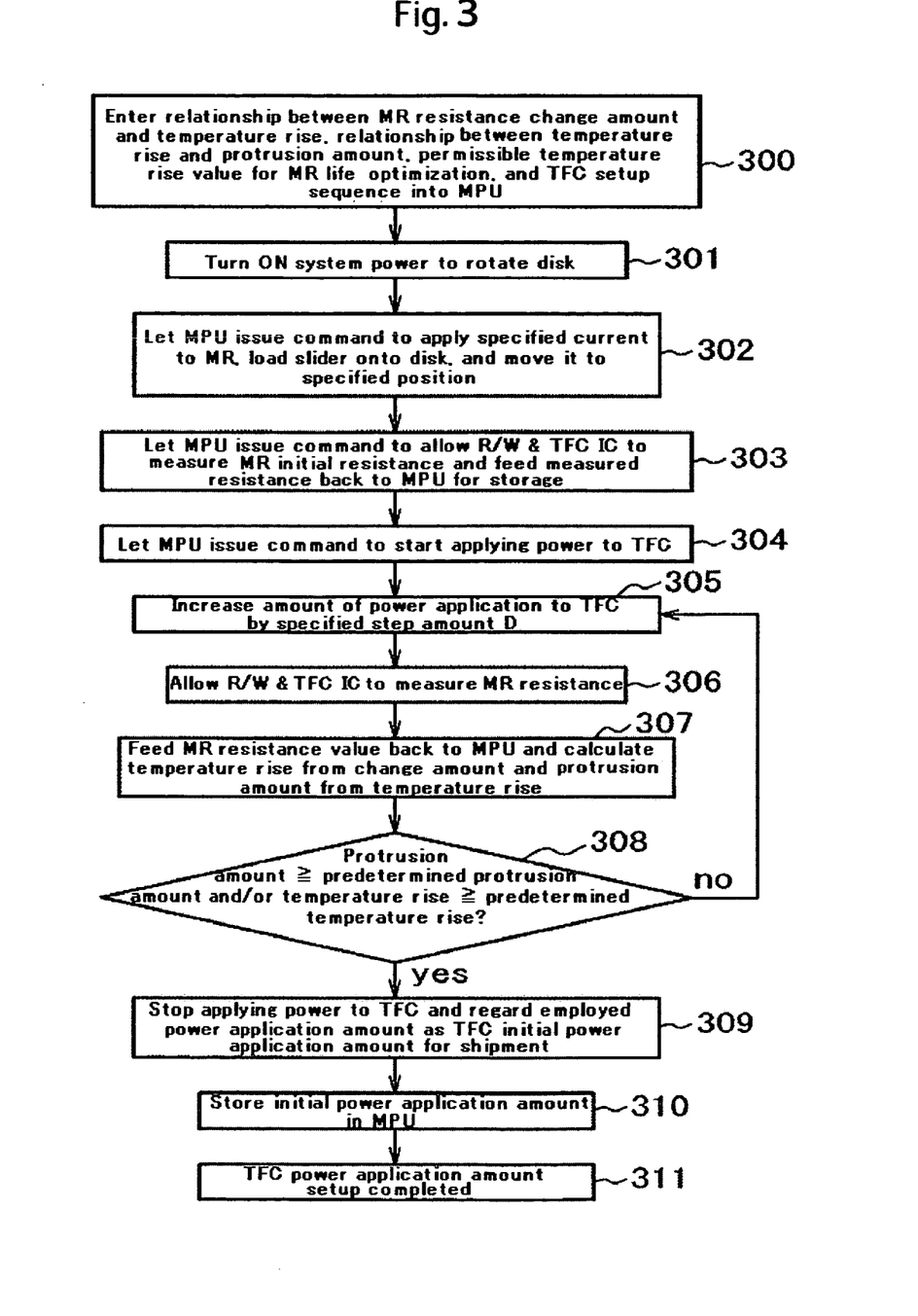
FIG. 3 is a flowchart illustrating a procedure for setting the amount of power application to a TFC heater in accordance with a second embodiment of the present invention.

A second embodiment of the present invention will now be described with reference to FIG. 3. FIG. 3 is a flowchart illustrating the processing steps to be performed when the hard disk drive (HDD) sets up the amount of power application to the TFC heater. The HDD is configured the same as the HDD 1 that is illustrated in FIG. 1. The integrated circuit 5 of this HDD includes a resistance measurement circuit for measuring the resistance of the magnetoresistive element of the magnetoresistive head 3.

Step 300 is first performed to enter in the MPU 7 the relationship between the amount of a magnetic resistance change dR in the magnetoresistive head and the amount of temperature rise dT, the relationship between the amount of temperature rise dT and the average amount Pav of magnetoresistive head protrusion, the permissible temperature rise value dT1 for magnetoresistive head life optimization, and the power application amount setup sequence for the TFC heater.

In step 301, the HDD 1 is turned ON to rotate the magnetic disk 2.

In step 302, the MPU 7 issues a command to apply a specified current to the magnetoresistive head 3, loads the magnetoresistive head 3 onto the magnetic disk, and moves the magnetoresistive head 3 to a specified position.

In step 303, the MPU 7 issues a command. In compliance with the command, the resistance measurement circuit operates to measure the initial resistance of the magnetoresistive element of the magnetoresistive head 3 and stores the measured value in the MPU 7.

In step 304, the MPU 7 issues another command. In compliance with the command, the heater power application circuit operates to start applying power to the TFC heater. In step 305, the heater power application circuit increases the power application amount V by a specified step amount Δ.

In step 306, the resistance measurement circuit operates to measure the magnetoresistive element's resistance value that prevails after power application to the TFC heater.

In step 307, the MPU 7 receives the magnetoresistive element's resistance value that prevails after power application to the TFC heater, calculates the resistance change amount dR from the received resistance value and the above-mentioned initial resistance value, determines the temperature rise amount dT from the resistance change amount dR, and determines the protrusion amount P2 from the temperature rise amount dT.

In step 308, the MPU 7 judges whether the required protrusion amount P1 is reached by the protrusion amount P2.

If the required protrusion amount P1 is not reached by the protrusion amount P2 in step 308, the program flow returns to step 305 so that the amount of power application V to the TFC heater is increased by the specified step amount Δ.

If the required protrusion amount P1 is reached by the protrusion amount P2 in step 308, step 309 is performed to stop applying power to the TFC heater. The employed power application amount V1 is then regarded as the TFC heater initial power application amount for shipment of the HDD. Next, step 301 is performed to store the TFC heater initial power application amount in the MPU 7.

TFC heater power application amount setup is now completed (step 311).

In step 308, the MPU 7 judges whether the required protrusion amount P1 is reached by the protrusion amount P2. Alternatively, however, the MPU 7 may decide whether the permissible temperature rise value dT1 for magnetoresistive head life optimization (the specified temperature that is stipulated according to the power application life of the magnetoresistive head 3) is reached by the temperature rise amount dT of the magnetoresistive head 3. If the specified temperature dT1 is not reached by the temperature rise amount dT, the program flow may return to step 305 so that the amount of power application V to the TFC heater is increased by the specified step amount Δ. If, on the other hand, the specified temperature dT1 is reached by the temperature rise amount dT, the prevailing power application amount V2 may be regarded as the TFC heater initial power application amount for shipment of the HDD.

In another alternative scheme for step 308, the MPU 7 may decide whether the required protrusion amount P1 is reached by the protrusion amount P2 of the magnetoresistive head 3 and decide whether the specified temperature dT1 stipulated by the power application life of the magnetoresistive head 3 is reached by the temperature rise amount dT of the magnetoresistive head 3. If neither the required protrusion amount P1 nor the specified temperature dT1 is reached, the amount of power application V to the TFC heater may be increased by the specified step amount Δ. If either the required protrusion amount P1 or the specified temperature dT1 is reached, the prevailing power application amount V3 may be regarded as the TFC heater initial power application amount.

The present embodiment provides the same advantages as the first embodiment, which has been described earlier. In the present embodiment, however, the HDD can independently set up the power application amount for the TFC heater. Therefore, it is possible to perform initial setup and adjust or correct the setting anytime at any place.

The second embodiment, which has been described above, also furnishes the integrated circuit 5 of the HDD 1 with a resistance measurement circuit for measuring the resistance value of the magnetoresistive element of the magnetoresistive head 3, calculates the resistance change amount from the initial resistance value of the magnetoresistive element and the magnetoresistive element's resistance value prevailing after power application to the TFC heater, and determines the temperature rise amount of the magnetoresistive head from the resistance change amount. However, an alternative is to furnish the integrated circuit 5 of the HDD 1 with a resistance measurement circuit for measuring the resistance of the TFC heater, calculate the resistance change amount from the initial resistance value of the TFC heater and the TFC heater's resistance value prevailing after power application to the TFC heater, and determine the temperature rise amount of the magnetoresistive head 3 from the resistance change amount of the TFC heater. In this case, the relationship between the heater temperature rise amount ΔT and head temperature rise amount dT and the relationship to the average head protrusion amount Pav must be entered in the MPU 7 beforehand as indicated in FIG. 5. In this case, too, the same advantages are provided as in the second embodiment, which has been described above.

As described above, the embodiments of the present invention make it possible to set up an optimum TFC heater power application amount while providing an adequate reliability margin in consideration of variations in the head and TFC heater resistance values and head characteristics (the output, the amount of temperature rise, the amount of protrusion of a surface facing the medium, the flying height of the head, etc.), which arise out of variations between lots, variations between wafers, variations within a wafer, and a machining process or the like. Consequently, it is possible to lengthen the life of the magnetoresistive head and the life of the TFC heater and consistently maintain an optimum flying height of the magnetoresistive head, thereby providing a high-reliability magnetic disk drive that is ideal for high-density magnetic read/write operations.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of setting the amount of power application to a heater incorporated in a magnetoresistive head for use with a magnetic disk drive that comprises a magnetic disk for storing information; a magnetoresistive head, which includes a heater for controlling a flying height over the magnetic disk and writes information onto and reads information from the magnetic disk; an integrated circuit, which carries a read/write circuit for the magnetoresistive head and a power application circuit for applying power to said heater; and a control processor, wherein said integrated circuit includes a resistance measurement circuit for measuring the resistance of said magnetoresistive head, the method comprising:

connecting to said magnetic disk drive a computer that stores the relationship between the amount of a resistance change in said magnetoresistive head and a temperature rise, the relationship between a temperature rise and the amount of magnetoresistive head protrusion, and a permissible temperature rise value for magnetoresistive head life optimization;

causing said control processor to control said resistance measurement circuit in accordance with instructions from said computer, measure an initial resistance value of said magnetoresistive head, and output the measured value to said computer;

starting to apply power to said heater, and causing said resistance measurement circuit to measure the resistance of said magnetoresistive head and output the measured resistance to said computer;

causing said computer to calculate the amount of a resistance change in said magnetoresistive head from a resistance value prevailing after power application to said heater and from said initial resistance value;

determining the amount of a temperature rise in said magnetoresistive head from the amount of said resistance change;

determining the amount of protrusion of said magnetoresistive head from the amount of said temperature rise;

judging whether a predetermined protrusion amount is reached by the amount of said protrusion;

increasing the amount of power application to said heater when the amount of said protrusion is smaller than the predetermined protrusion amount; and storing, when the predetermined protrusion amount is reached by the amount of said protrusion, the prevailing amount of power application in said control processor as the amount of power application to said heater.

2. The method of setting the amount of power application to a heater incorporated in a magnetoresistive head according to claim 1, wherein said computer further judges whether said permissible temperature rise value for magnetoresistive head life optimization is reached by the amount of a temperature rise in said magnetoresistive head, and stores the prevailing amount of power application in said control processor as the amount of power application to said heater when the amount of said protrusion is smaller than the predetermined protrusion amount and said permissible temperature rise value is reached by the amount of said temperature rise.

3. The method of setting the amount of power application to a heater incorporated in a magnetoresistive head according to claim 1, wherein said computer further judges whether said permissible temperature rise value for magnetoresistive head life optimization is reached by the amount of a temperature rise in said magnetoresistive head, and stores the prevailing amount of power application in said control processor as the amount of power application to said heater when the predetermined protrusion amount is reached by the amount of said protrusion or said permissible temperature rise value is reached by the amount of said temperature rise.

4. The method of setting the amount of power application to a heater incorporated in a magnetoresistive head according to claim 1, wherein the power application amount to be stored in said control processor is the amount of initial power application to said heater.

5. A method of setting the amount of power application to a heater incorporated in a magnetoresistive head for use with a magnetic disk drive that comprises a magnetic disk for storing information; a magnetoresistive head, which includes a heater for controlling a flying height over the magnetic disk and writes information onto and reads information from the magnetic disk; an integrated circuit, which carries a read/write circuit for the magnetoresistive head and a power application circuit for applying power to said heater; and a control processor, wherein said integrated circuit includes a resistance measurement circuit for measuring the resistance of said heater, the method comprising:

connecting to said magnetic disk drive a computer that stores the relationship between the amount of a resistance change in said heater and a temperature rise, the relationship between a temperature rise and the amount of magnetoresistive head protrusion, and a permissible temperature rise value for magnetoresistive head life optimization;

causing said control processor to control said resistance measurement circuit in accordance with instructions from said computer, measure an initial resistance value of said heater, and output the measured value to said computer;

starting to apply power to said heater, and causing said resistance measurement circuit to measure the resistance of said heater and output the measured resistance to said computer;

causing said computer to calculate the amount of a resistance change in said heater from a resistance value prevailing after power application to said heater and from said initial resistance value;

determining the amount of a temperature rise in said heater from the amount of said resistance change;

determining the amount of protrusion of said magnetoresistive head from the amount of said temperature rise;

judging whether a predetermined protrusion amount is reached by the amount of said protrusion;

increasing the amount of power application to said heater when the amount of said protrusion is smaller than the predetermined protrusion amount; and storing, when the predetermined protrusion amount is reached by the amount of said protrusion, the prevailing amount of power application in said control processor as the amount of power application to said heater.

6. The method of setting the amount of power application to a heater incorporated in a magnetoresistive head according to claim 5, wherein said computer further judges whether said permissible temperature rise value for magnetoresistive head life optimization is reached by the amount of a temperature rise in said heater, and stores the prevailing amount of power application in said control processor as the amount of power application to said heater when the amount of said protrusion is smaller than the predetermined protrusion amount and said permissible temperature rise value is reached by the amount of said temperature rise.

7. The method of setting the amount of power application to a heater incorporated in a magnetoresistive head according to claim 5, wherein said computer further judges whether said permissible temperature rise value for magnetoresistive head life optimization is reached by the amount of a temperature rise in said heater, and stores the prevailing amount of power application in said control processor as the amount of power application to said heater when the predetermined protrusion amount is reached by the amount of said protrusion or said permissible temperature rise value is reached by the amount of said temperature rise.

8. A magnetic disk drive comprising:

a magnetic disk for storing information;

a magnetoresistive head, which includes a heater for controlling a flying height over the magnetic disk and writes information onto and reads information from the magnetic disk;

an integrated circuit, which carries a read/write circuit for supplying a write signal to said magnetoresistive head and receiving a read signal from said magnetoresistive head, a resistance measurement circuit for measuring the resistance of said magnetoresistive head, and a power application circuit for applying power to said heater; and a control processor that stores the relationship between the amount of a resistance change in said magnetoresistive head and a temperature rise, the relationship between a temperature rise and the amount of magnetoresistive head protrusion, and a permissible temperature rise value for magnetoresistive head life optimization;

wherein said control processor supplies a specified current to said magnetoresistive head; causes said resistance measurement circuit to measure an initial resistance value of said magnetoresistive head; starts applying power to said heater and causes said resistance measurement circuit to measure the resistance of said magnetoresistive head; calculates the amount of a resistance change in said magnetoresistive head from a resistance value prevailing after power application to said heater and from said initial resistance value; determines the amount of a temperature rise in said magnetoresistive head from the amount of said resistance change; determines the amount of protrusion of said magnetoresistive head from the amount of said temperature rise; judges whether a predetermined protrusion amount is reached by the amount of said protrusion; increases the amount of power application to said heater when the amount of said protrusion is smaller than the predetermined protrusion amount; and stores, when the predetermined protrusion amount is reached by the amount of said protrusion, the prevailing amount of power application as the amount of power application to said heater.

9. The magnetic disk drive according to claim 8, wherein said control processor further judges whether said permissible temperature rise value for magnetoresistive head life optimization is reached by the amount of a temperature rise in said magnetoresistive head, and stores the prevailing amount of power application as the amount of power application to said heater when the amount of said protrusion is smaller than the predetermined protrusion amount and said permissible temperature rise value is reached by the amount of said temperature rise.

10. The magnetic disk drive according to claim 8, wherein said control processor further judges whether said permissible temperature rise value for magnetoresistive head life optimization is reached by the amount of a temperature rise in said magnetoresistive head, and stores the prevailing amount of power application as the amount of power application to said heater when the predetermined protrusion amount is reached by the amount of said protrusion or said permissible temperature rise value is reached by the amount of said temperature rise.

11. A magnetic disk drive comprising:

a magnetic disk for storing information;

a magnetoresistive head, which includes a heater for controlling a flying height over the magnetic disk and writes information onto and reads information from the magnetic disk;

an integrated circuit, which carries a read/write circuit for supplying a write signal to said magnetoresistive head and receiving a read signal from said magnetoresistive head, a resistance measurement circuit for measuring the resistance of said heater, and a power application circuit for applying power to said heater; and a control processor that stores the relationship between the amount of a resistance change in said heater and a temperature rise, the relationship between a temperature rise and the amount of magnetoresistive head protrusion, and a permissible temperature rise value for magnetoresistive head life optimization;

wherein said control processor supplies a specified current to said magnetoresistive head; causes said resistance measurement circuit to measure an initial resistance value of said heater; starts applying power to said heater and causes said resistance measurement circuit to measure the resistance of said heater; calculates the amount of a resistance change in said heater from a resistance value prevailing after power application to said heater and from said initial resistance value; determines the amount of a temperature rise in said heater from the amount of said resistance change; determines the amount of protrusion of said magnetoresistive head from the amount of said temperature rise; judges whether a predetermined protrusion amount is reached by the amount of said protrusion; increases the amount of power application to said heater when the amount of said protrusion is smaller than the predetermined protrusion amount; and stores, when the predetermined protrusion amount is reached by the amount of said protrusion, the prevailing amount of power application as the amount of power application to said heater.

12. The magnetic disk drive according to claim 11, wherein said control processor further judges whether said permissible temperature rise value for magnetoresistive head life optimization is reached by the amount of a temperature rise in said heater, and stores the prevailing amount of power application as the amount of power application to said heater when the amount of said protrusion is smaller than the predetermined protrusion amount and said permissible temperature rise value is reached by the amount of said temperature rise.

13. The magnetic disk drive according to claim 11, wherein said control processor further judges whether said permissible temperature rise value for magnetoresistive head life optimization is reached by the amount of a temperature rise in said heater, and stores the prevailing amount of power application as the amount of power application to said heater when the predetermined protrusion amount is reached by the amount of said protrusion or said permissible temperature rise value is reached by the amount of said temperature rise.

* * * * *